Patented Apr. 4, 1939

2,152,693

UNITED STATES PATENT OFFICE 2,152,693

PRODUCTION OF SULPHUR DYES

Raymond W. Hess, Buffalo, N. Y., assignor to National Aniline & Chemical Company, Inc., New York, N. Y., a corporation of New York No Drawing. Application September 21, 1937, Serial No. 164,997

17 Claims. (Cl. 260—134)

The present invention relates to sulphur dyes and to a process for their preparation. It particularly relates to an improvement in a process for the manufacture of sulphur dyes whereby sulphur dyes of increased value with respect to their dyeing properties are obtained.

An object of the invention is to provide an improvement in the process for the preparation of sulphur dyes from an indophenol or a leuco indophenol and a polysulphide whereby dyes producing dyeings on textile materials having increased brightness and a more desirable shade as compared with dyeings obtained with dyes prepared in accordance with known procedures but without the use of the improvement.

A further object of the invention is to provide sulphur dyes producing dyeings on textile materials characterized by their greater brightness and desirability of shade as compared with dyeings obtained with previously known sulphur dyes of this type.

Other objects of the invention will in part be obvious and will in part appear hereinafter.

Sulphur dyes have been prepared in accordance with one well-known method of procedure by heating an indophenol with a polysulphide; e. g., a polysulphide of an alkali metal, in the presence of a suitable solvent such as, for example, water, alcohol, and the like. At the completion of the sulphuration, the dye has been isolated from the sulphuration melt, among other methods, by diluting the sulphuration melt with water and aerating the diluted mass to oxidize and precipitate the dye, or by adding a mineral acid to the melt. By either procedure, the sulphide present in the sulphuration melt is decomposed whereby some free sulphur is precipitated along with the dye.

In processes of this type, the polysulphide employed may be prepared by dissolving sulphur in an alkali metal monosulphide or in caustic alkali. The polysulphide may be a sulphide lower than the pentasulphide, for example, a tetrasulphide, but, as pointed out in my United States Patent 1,978,083, dyes having particularly high tinctorial value may be prepared from an indophenol of the probable formula (1)

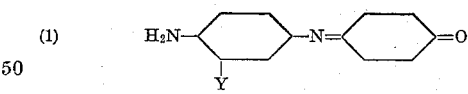

wherein Y represents hydrogen or an alkyl group and wherein the benzene nuclei may contain substituents other than halogen, with the use of a sulphide not lower than a pentasulphide. As further pointed out in my patent, the proportion of the polysulphide to that of indophenol is preferably such that, at the end of the sulphuration, there is present in the melt a sulphide which corresponds approximately to the tetrasulphide.

Although with the use of a polysulphide not lower than a pentasulphide in the process, dyes are obtained having high tinctorial value, on isolating these dyestuffs from the diluted sulphuration melt containing a polysulphide, preferably a tetrasulphide, as by blowing air through the solution to oxidize and precipitate the dye, the dye is obtained containing a proportion of sulphur. It appears that during the aeration the polysulphide is decomposed to a thiosulphate and sulphur, and the sulphur is precipitated along with the dye. As disclosed in my prior patent, a dye of the type under consideration may be obtained free from sulphur, by dissolving or holding in solution the sulphur liberated by decomposition of the sulphide. Where the method of decomposition by aeration is employed, this may be accomplished by the addition of an alkali to the sulphuration melt at the completion of the sulphuration, either before, after, or during decomposition of the sulphide. In the acid decomposition method, the alkali may be added after decomposition of the sulphide and is followed by aeration. In either case, this treatment results in the conversion of the excess sulphur in the sulphuration melt to a soluble thiosulphate. The aeration or equivalent oxidation treatment in accordance with my prior patent is continued only to the point where the excess sulphur becomes soluble in the diluted mass; i. e., is converted to thiosulphate; the dye remaining is at that time separated from the remainder of the dilute mixture.

The present invention relates to an improvement in processes of the type discussed above; i. e., processes for the preparation of a sulphur dye wherein an indophenol is heated with a polysulphide, preferably in the presence of a solvent, such as water, alcohol, and the like. It particularly relates to an improvement in the process described in my United States patent above referred to. The dyes obtained with the use of the improvement are productive of dyeings characterized by increased brightness and a modification of shade.

It has been discovered in accordance with the present invention that sulphur dyes prepared by known processes involving the heating of an indophenol or a leuco indophenol with a polysulphide can be converted to dyes having improved dyeing properties by subjecting them to an oxidation treatment in a distinctly alkaline solution which is free from oxidizable sulphides and sulphur. This oxidation treatment is in addition to the oxidation treatment to which sulphur dyes of this type may be subjected in order to separate them from the sulphuration melts in which they are formed or to remove oxidizable sulphides therefrom.

By subjecting sulphur dyes of the class under consideration to the oxidation treatment described, a change in the character of the dyes occurs whereby they are rendered capable of producing dyeings on textile materials distinguished by increased brightness and a modification of shade. For example, by modifying the process disclosed in my prior patent for the preparation of sulphur dyes from substituted indophenols of the class represented by the above formula (1) or their leuco derivatives to include the additional alkaline oxidation treatment, dyes are obtained that differ in important respects from the dyes prepared according to the patent. Thus, while similarly to the dyes of the patent the dyes prepared by the modified process dye unmordanted cotton from the usual sodium sulphide bath in shades varying from gray to olive which turn blue on exposure to the air, the blue shades obtained are distinguished by increased brightness and redness in tone. Shades of blue of this type are much sought after in the art and consequently the present improvement provides a method for the preparation of valuable sulphur dyes.

As previously stated, the sulphur dyes that may be converted to a form having improved dyeing properties with the use of the present improvement are those which are prepared from indophenols or their leuco derivatives by heating a compound of this type with a polysulphide. The dyes preferably employed as starting materials are those prepared in accordance with the process described in my prior patent and derived from the indophenols included within the scope of the above formula (1); it having been found that particularly valuable results are obtained by subjecting such dyes to the additional oxidation treatment under alkaline conditions. However, sulphur dyes derived from other indophenols or their leuco derivatives may be subjected to this treatment with advantageous results. Thus, sulphur dyes may be so treated which are derived from indophenols and the corresponding leuco compounds which may be represented by the following general formula:

(2) 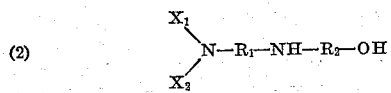

wherein $X_1$ and $X_2$ may be the same or different, and each represents hydrogen or an alkyl group such as, for example, a methyl, ethyl, propyl, butyl, benzyl, group, or an aryl group such as, for example, unsubstituted or substituted aryl groups of the benzene and naphthalene series; $R_1$ and $R_2$ each represents the same or different mono- or polynuclear aryl residue, for example, an aryl residue of the benzene or naphthalene series, in which the amino group and the hydroxyl group are in the para-position to the —NH— group. As indicated, the aryl groups of the molecules of the indophenols and leuco indophenols represented by the above formula may be unsubstituted or may contain substituents; such as, for example, halogen or amino, alkyl, alkoxy, and sulphonic acid groups. An indophenol of the class represented by the above formula (2) is designated in the claims as an indophenol which, in the leuco form, is a 4-amino-4'-hydroxy diarylamine in which the amino radical in the 4-position is selected from the group consisting of the unsubstituted amino radical, and alkylamino and arylamino radicals.

The process may be carried out in accordance with one embodiment of the invention in the following manner. A sulphuration melt is prepared by heating together an indophenol; e. g., an indophenol of the type represented by formula (1), and a concentrated solution of a polysulphide, preferably an alkali metal polysulphide not lower than a pentasulphide, with agitation until a test shows the absence of indophenol. The sulphuration melt obtained in this manner is then diluted with water and the solution is made alkaline with a suitable compound of an alkali-forming metal, preferably an alkali metal hydroxide. The resulting mixture is then aerated, which initially results in the oxidation and precipitation of the dye and the conversion of the polysulphide therein to a thiosulphate and free sulphur. However, because of the alkaline character of the solution, the sulphur is retained in solution by being converted to a thiosulphate. The reaction mixture, therefore, is a mixture free from oxidizable sulphides and sulphur. At this point, in accordance with the prior procedure, the dye would be separated from the remainder of the reaction mixture. In accordance with the present invention, the dye is retained in the mixture and the aeration is continued, while maintaining the solution alkaline, until a test shows that the dye has attained the desired brightness and modification of shade. The time necessary to convert the dye into a form possessing the desired improved dyeing properties is determined by a dyeing test with a sample of the dye withdrawn from the aerated mixture. When the dye in the mixture has been found to have the desired dyeing properties, it is isolated and dried in any suitable manner.

In the above process the additional oxidation step is made a part of the process for the preparation of the dye, and is in effect a continuation of the oxidation treatment previously employed for the initial oxidation and precipitation of the dyestuff and removal of free sulphur, with addition of further amounts of alkaline material if necessary to maintain the alkaline character of the mixture. For reasons of convenience and simplicity of operation, this is the preferred manner of carrying out the present improvement. Dyes having substantially the same properties may be obtained, however, by proceeding as above described up to the point where the free sulphur in the reaction mixture has been converted to a thiosulphate and, at this stage, separating the dye from the remainder of the reaction mixture. The dye recovered from the reaction mixture, preferably before being dried, may be slurred in an alkaline solution and may then be oxidized to form a dye possessed of the desirable properties. However, in processes of this type the dilute mixture, prior to the addition of alkali, may be aerated to oxidize and precipitate the dye along with the free sulphur produced by oxidation of the residual polysulphide and the precipitate may be separated from the remainder of the mixture; the sulphur may then be removed from the dye by slurring the precipitate in an alkaline solution, and aerating if necessary or desirable; and the dye suspended in the mixture at this point may be separated from the solution containing thiosulphate and then be reslurred in another alkaline solution and be subjected to an oxidation treatment to improve its dyeing properties. Or, more simply, the oxidation treatment may be carried out by retaining the dye in the mixture treated for the removal of sulphur and subjecting it therein to the additional oxidation treatment.

In processes where the dye is precipitated from the sulphuration melt by the addition of a mineral acid or a salt; e. g., sodium chloride, the dye after separation from the remainder of the reaction mixture may be converted to a more valuable form in accordance with the present invention by first removing the oxidizable sulphides and free sulphur present therein, and then subjecting the dye to an alkaline oxidation treatment. To remove the oxidizable sulphides and free sulphur from the dye, it is preferred to slurry the dye in an alkaline solution and then aerate. The additional oxidation may then be effected by merely continuing the aeration treatment while maintaining the alkaline character of the mixture, or otherwise as above indicated.

Since it has been found that the oxidation step proceeds in a simple and efficient manner with the use of air as the oxidizing agent, it is preferred to carry out this step by aerating the mixture containing the dye. It will be understood, however, that this oxidation step may be carried out with the use of any suitable oxidizing agent.

In order that the invention may be better understood, reference should be had to the following example in which is described a preferred manner of carrying out the process of the present invention. The parts are by weight and the temperatures in degrees centigrade.

*Example 1—Part 1.*—In this part of the example there is described the preparation of a sulphuration melt containing a sulphur dye. It will be understood that the preparation of the sulphuration melt is not a part of the present invention, but is given merely as a basis for the description of one manner of carrying out the present improvement. The sulphuration is carried out as follows: A polysulfide is prepared by mixing together 667 parts ground sulphur and 356 parts caustic soda as a concentrated aqueous solution, in a sulphuration kettle equipped with an agitator and a reflux condenser. The mixture is heated to a temperature of about 90° to 95° to aid the solution of the sulphur in the caustic liquor.

180 parts of an indophenol in the form of a 30 per cent aqueous paste and having the following probable formula:

(3) 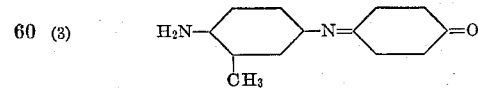

are then slowly added to the polysulfide solution at 100° to 110°, about 15 to 20 minutes being required for the addition. The charge, which corresponds to 3.5 mols $Na_2S_6$ per mol of indophenol, is then heated to vigorous boiling and the boiling point adjusted to 115° by evaporating off water or by adding water thereto as conditions may necessitate. Agitation is carried on throughout the sulphuration. The reaction mixture is then boiled at 115° for about 10 to 12 hours, or until a test shows the absence of indophenol. Heating is continued for a short time after the disappearance of the indophenol to insure complete reaction.

*Part 2.*—The sulphuration melt thus obtained is diluted with 10,000 parts of water and a concentrated aqeuous solution of caustic soda containing 267 parts of caustic soda is gradually added thereto. The rapidly agitated mixture is warmed to between 50° and 60° and aerated until the dye is precipitated and the sulfide in the solution has disappeared completely. The mixture is free from sulphur which, because of the alkaline character of the solution during the oxidation, has been converted to a soluble thiosulfate.

*Part 3.*—The mixture prepared in accordance with Part 2 of this example, which is distinctly alkaline, is then aerated at about 50° to 60° until the dye has acquired the additional desired brightness and redness of shade as shown by a dyeing test with a sample of the dye withdrawn from the aerated mixture, about 5 hours being required. During the additional aeration, the mixture is maintained distinctly alkaline with the addition of further amounts of caustic soda, if necessary. At the completion of the oxidation, the precipitated dye is isolated by filtration and is washed and dried.

The dye obtained in this manner dyes unmordanted cotton gray to olive shades, which on exposure to the atmosphere are oxidized to a blue which is distinctly brighter and redder in tone than the shade obtained with the same dye prepared without the additional alkaline oxidation.

The oxidation treatment described in the foregoing example may be applied for the improvement of sulphur dyes obtained from a wide variety of indophenols and leuco indophenols included within the scope of the formula (2) set out above. For example, this treatment may be applied with advantage to the sulphur dyes obtained by heating a polysulphide, preferably an alkali metal polysulphide, with any one of the following indophenols in the leuco or oxidized condition: 4-hydroxy-4'-amino - diphenylamine, 4-hydroxy-4'-dialkylamino - diphenylamine, 4-hydroxy-4'-amino-3'-alkyl-diphenylamine (in the latter two compounds, the alkyl groups may be methyl, ethyl, propyl, butyl, benzyl groups, etc.) 4-hydroxy - 3,5 - dichlor-4'-amino-diphenylamine, 4-hydroxy - 4'- phenylamino - diphenylamine, 4'-amino-phenyl-1-imino-4-naphthol, 4 - hydroxyphenyl-1'-imino-4' - N - phenyl - naphthylamine, and 4-hydroxyphenyl-1'-imino-4'-N-phenyl-5'-sulpho-naphthylamine.

In carrying out the oxidation step, it is important to maintain the aqueous medium containing the sulphur dye distinctly alkaline throughout the oxidation. The alkalinity of the mixture during the oxidation is preferably maintained with an alkali metal hydroxide at about the alkalinity of dilute caustic soda (e. g., as shown by Clayton Yellow paper). Other alkaline materials such as, for example, alkali metal carbonates, borates, and phosphates may be employed in the process of the present invention. However, since it has been found that for best results the mixtures should be distinctly alkaline, such materials are not as satisfactory as the alkali metal hydroxides. Instead of using air as the oxidizing agent, any other suitable oxidizing agent, such as, for example, hydrogen peroxide, alkali metal and ammonium perborates, and sodium peroxide, may be used. The oxidation is ordinarily carried out between ordinary atmospheric temperatures and about 100° C.; i. e., about the boiling point of the aqueous solution in the mixture. The time necessary to carry out effectively the oxidation treatment cannot be exactly stated since it is dependent upon a number of factors; such as the particular dye subjected to treatment, the impurities present, etc. As already stated, the completion of the treatment is best determined by a dyeing test with a sample of the dye removed from the mixture. In this connection, however, it has been found that when a dye of the desirable shade is obtained, additional oxidation is of no value or even harmful to the yield of dyestuff.

Since certain changes may be made in carrying out the above process without departing from the scope of the invention, it is intended that all matter contained in the above description shall be interpreted as illustrative and not in a limiting sense.

I claim:

1. The process for improving the dyeing properties of a sulphur dye obtainable by heating an indophenol with a polysulphide which comprises subjecting the dye free from oxidizable sulphides and sulphur to an alkaline oxidation treatment.

2. The process for improving the dyeing properties of a sulphur dye obtainable by heating with a polysulphide, an indophenol which, in the leuco form, is a 4-amino-4'-hydroxy diarylamine in which the amino radical in the 4-position is selected from the group consisting of the unsubstituted amino radical, and alkylamino and arylamino radicals, which comprises subjecting an aqueous mixture of the dye free from oxidizable sulphides and sulphur to an oxidation treatment while maintaining the mixture alkaline with caustic alkali.

3. The process for improving the dyeing properties of a sulphur dye obtainable by heating an indophenol with a polysulphide which comprises aerating an alkaline aqueous mixture containing the dye free from oxidizable sulphides and sulphur until the dye is converted to a form producing dyeings of increased brightness and being modified in shade as compared with the dyeings produced by the dye before such treatment.

4. The process for improving the dyeing properties of a sulphur dye obtainable by a process wherein an indophenol is heated with an alkali metal polysulphide and the dye is obtained in a dilute mixture free from oxidizable sulphides and sulphur, which comprises subjecting the dye before drying to an alkaline oxidation treatment until the dye is converted to a form producing dyeings of increased brightness and being modified in shade as compared with the dyeings produced by the dye before such treatment.

5. The process for improving the dyeing properties of a sulphur dye obtainable by a process wherein an indophenol which, in the leuco form, is a 4-amino-4'-hydroxy diarylamine in which the amino radical in the 4-position is selected from the group consisting of the unsubstituted amino radical, and alkylamino and arylamino radicals is heated with an alkali-metal polysulphide and the dye is obtained in a dilute mixture free from oxidizable sulphides and sulphur, which comprises subjecting the dye before drying to an alkaline oxidation treatment until the dye is converted to a form producing dyeings of increased brightness and being modified in shade as compared with the dyeings produced by the dye before such treatment.

6. The process for improving the dyeing properties of a sulphur dye obtainable by a process wherein an indophenol is heated with an alkali metal polysulphide and the dye is obtained in a dilute mixture free from oxidizable sulphides and sulphur, which comprises, before drying said dye, treating said dye in an alkaline aqueous mixture with an oxidizing agent until the dye is converted to a form producing dyeings of increased brightness and being modified in shade as compared with the dyeings produced by the dye before such treatment.

7. The process for improving the dyeing properties of a sulphur dye obtainable by a process wherein an indophenol is heated with an alkali metal polysulphide and the dye is obtained in a dilute mixture free from oxidizable sulphides and sulphur, which comprises, before drying said dye, aerating an alkaline aqueous mixture containing said dye until the dye is converted to a form producing dyeings of increased brightness and being modified in shade as compared with the dyeings produced by the dye before such treatment.

8. The process for improving the dyeing properties of a sulphur dye obtainable by a process in which an indophenol of the class which, in the oxidized form, is represented by the following general formula:

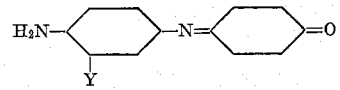

wherein Y represents a member selected from the group consisting of hydrogen and alkyl radicals, is heated with an alkali metal polysulphide and the dye is obtained in a dilute mixture free from oxidizable sulphides and sulphur, which comprises subjecting the dye before drying to an alkaline oxidation treatment until the dye is converted to a form producing dyeings of increased brightness and being modified in shade as compared with the dyeings produced by the dye before such treatment.

9. In a process for the preparation of a sulphur dye comprising heating an indophenol with an alkali metal polysulphide to form a sulphuration mass containing the sulphur dye, diluting the mass, precipitating the sulphur dye, and freeing the dilute mixture from oxidizable sulphides and surphur, the improvement which comprises subjecting the dye in the resulting mixture to an alkaline oxidation treatment until said dye is converted to a form producing dyeings of increased brightness and being modified in shade as compared with the dyeings produced by the dye before such treatment.

10. In a process for the preparation of a sulphur dye comprising heating an indophenol with an alkali metal polysulphide to form a sulphuration mass containing the sulphur dye, diluting the mass, precipitating the sulphur dye, and freeing the dilute mixture from oxidizable sulphides and sulphur, the improvement which comprises subjecting the dye in the resulting mixture to an aeration treatment while maintaining the mixture alkaline until said dye is converted to a form producing dyeings of increased brightness and being modified in shade as compared with the dyeings produced by the dye before such treatment.

11. In a process for the preparation of a sulphur dye comprising heating with an alkali metal polysulphide, an indophenol which, in the leuco form, is a 4-amino-4'-hydroxy diarylamine in which the amino radical in the 4-position is selected from the group consisting of the unsubstituted amino radical, and alkylamino and arylamino radicals, to form a sulphuration mass containing the sulphur dye, diluting the mass, precipitating the sulphur dye, and freeing the dilute mixture from oxidizable sulphides and sulphur, the improvement which comprises subjecting the dye in the resulting mixture to an aeration treatment while maintaining the mixture alkaline with an alkali metal hydroxide until said dye is converted to a form producing dyeings of increased brightness and being modified in shade as compared with the dyeings produced by the dye before such treatment.

12. In a process for the preparation of a blue sulphur dye comprising heating an indophenol of the class which, in the oxidized form, is represented by the following general formula:

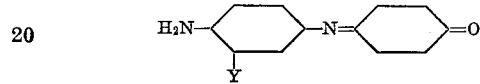

wherein Y represents a member selected from the group consisting of hydrogen and alkyl radicals, with an alkali-metal polysulphide to form a sulphuration mass containing the sulphur dye, diluting the mass, precipitating the sulphur dye, and freeing the dilute mixture from oxidizable sulphides and sulphur, the improvement which comprises subjecting the dye in the resulting mixture to an alkaline oxidation treatment until said dye is converted to a form producing blue dyeings of increased brightness and having a redness of shade as compared with the dyeings produced by the dye before such treatment.

13. In a process for the preparation of a blue sulphur dye comprising heating an indophenol of the class which, in the oxidized form, is represented by the following general formula:

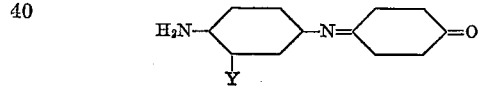

wherein Y represents a member selected from the group consisting of hydrogen and alkyl radicals, with an alkali-metal polysulphide to form a sulphuration mass containing the sulphur dye, diluting the mass, precipitating the sulphur dye, and freeing the dilute mixture from oxidizable sulphides and sulphur, the improvement which comprises aerating the dye in the resulting mixture while maintaining the mixture distinctly alkaline with an alkali-metal hydroxide until said dye is converted to a form producing blue dyeings of increased brightness and having a redness of shade as compared with the dyeings produced by the dye before such treatment.

14. In a process for the preparation of a blue sulphur dye comprising heating a compound having the formula:

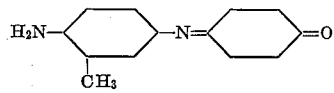

with an alkali metal polysulphide not lower than the pentasulphide to form a sulphuration mass containing the sulphur dye, diluting the mass, precipitating the sulphur dye, and freeing the dilute mixture from oxidizable sulphides and sulphur, the improvement which comprises subjecting the dye in the resulting mixture to an alkaline oxidation treatment until said dye is converted to a form producing blue dyeings of increased brightness and redness of shade as compared with the dyeings produced by the dye before such treatment.

15. In a process for the preparation of a blue sulphur dye comprising heating a compound having the formula:

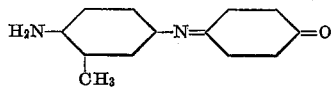

with an alkali metal polysulphide not lower than the pentasulphide to form a sulphuration mass containing the sulphur dye, diluting the mass, precipitating the sulphur dye, and freeing the dilute mixture from oxidizable sulphides and sulphur, the improvement which comprises aerating the dye in the resulting mixture while maintaining the mixture distinctly alkaline with sodium hydroxide until said dye is converted to a form producing blue dyeings of increased brightness and redness of shade as compared with the dyeings produced by the dye before such treatment.

16. A sulphur dye obtainable by the process of claim 12 producing on unmordanted cotton from the usual sodium sulphide bath a blue color characterized by its brightness and redness of shade as compared with the blue color produced by the sulphur dye obtainable by the same process but omitting the alkaline oxidation treatment.

17. A sulphur dye obtainable by the process of claim 14 producing on unmordanted cotton from the usual sodium sulphide bath a blue color characterized by its brightness and redness of shade as compared with the blue color produced by the sulphur dye obtainable by the same process but omitting the alkaline oxidation treatment.

RAYMOND W. HESS.